(12) United States Patent
Kienzle

(10) Patent No.: US 8,886,470 B2
(45) Date of Patent: Nov. 11, 2014

(54) PROACTIVE ADAPTIVE EQUIPMENT MAINTENANCE

(75) Inventor: Stefan Kienzle, St. Leon-Rot (DE)

(73) Assignee: SAP SE, Walldorf (DE)

( * ) Notice: Subject to any disclaimer, the term of this patent is extended or adjusted under 35 U.S.C. 154(b) by 569 days.

(21) Appl. No.: 13/017,439

(22) Filed: Jan. 31, 2011

(65) Prior Publication Data

US 2012/0194347 A1 Aug. 2, 2012

(51) Int. Cl.
- *G01L 1/00* (2006.01)
- *G05B 13/02* (2006.01)
- *G06Q 10/00* (2012.01)
- *G06Q 10/06* (2012.01)

(52) U.S. Cl.
CPC .................................. *G06Q 10/0631* (2013.01)
USPC ................................ 702/42; 700/28; 705/305

(58) Field of Classification Search
USPC ...................... 702/42, 33–36, 43, 81, 84, 127, 702/173–175, 177, 179, 187–189, 193, 702/196; 705/7.11–7.12, 7.22, 7.36, 705/7.38–7.39, 7.41, 305, 414; 700/9, 21, 700/28–34, 44, 65, 108–110, 115; 340/500, 340/613, 665–666
See application file for complete search history.

(56) References Cited

U.S. PATENT DOCUMENTS

| | | | |
|---|---|---|---|
| 2003/0093178 A1* | 5/2003 | Russell et al. | 700/217 |
| 2006/0208893 A1* | 9/2006 | Anson et al. | 340/572.1 |
| 2006/0230003 A1* | 10/2006 | Sung et al. | 705/414 |

OTHER PUBLICATIONS

Prothmann et al., Deterioration Modeling Strategy for Pro-Active Services of Commercial Vehicles, Jun. 30-Jul. 2, 2010, American Control Conference, Marriott Waterfront, Baltimore, MD, pp. 6157-6162.*

* cited by examiner

*Primary Examiner* — Toan Le

(74) *Attorney, Agent, or Firm* — Schwegman, Lundberg & Woessner, P.A.

(57) ABSTRACT

Systems and methods to provide proactive adaptive equipment maintenance. In example embodiments, a stress layout representing a physical location is maintained. The stress layout includes a grid system having a plurality of cells. A maintenance indicator value for each cell in which a fixed object is located is calculated. This maintenance indicator value represents a stress level applied to the fixed object. A determination whether the maintenance indicator value exceeds a maintenance threshold for the fixed object is performed. Based on the determining that the maintenance indicator value exceeds the maintenance threshold, automatic generation of a maintenance order for the fixed object is triggered.

20 Claims, 7 Drawing Sheets

| A1 | | | | |
|---|---|---|---|---|
| B1 | B2 OBJ #1 100 ⊗ A | B3 OBJ #1 | B4 OBJ #1 | ⋮ |
| C1 | C2 OBJ #1 | C3 OBJ #1 100 ⊗ | C4 OBJ #1 | ⋮ |
| D1 | D2 OBJ #1 | D3 OBJ #1 | D4 OBJ #1 100 ⊗ B | 102 |
| ⋮ | ⋮ | ⋮ | ⋮ 102 | 102 |
| A2 | A3 | A4 | ⋮ | |

| A1 | B1 | C1 | D1 | | |
|---|---|---|---|---|---|
| A2<br>OBJ #2<br>500 | B2<br>OBJ #1<br>8000 | C2<br>OBJ #1<br>100 | D2<br>OBJ #1<br>0 | | 102 |
| A3<br>OBJ #2<br>450 | B3<br>OBJ #1<br>200 | C3<br>OBJ #1<br>9000 | D3<br>OBJ #1<br>700 | | 102 |
| A4 | B4<br>OBJ #1<br>0 | C4<br>OBJ #1<br>6000 | D4<br>OBJ #1<br>100<br>100 | | |
| ⋮ | ⋮ | ⋮ | ⋮ | ⋮ | 102 |
| | | | | | 102 |

PROACTIVE ADAPTIVE EQUIPMENT MAINTENANCE

FIELD

The present disclosure relates generally to equipment maintenance, and in a specific example embodiment, to proactive adaptive equipment maintenance.

BACKGROUND

Typically, equipment will need to undergo maintenance. In order to be cautious, organizations may perform maintenance too often or before the maintenance is actually required or needed. This excessive maintenance not only is more costly but also needlessly removes the equipment from usage, which may hamper or delay a process for which the equipment is used.

BRIEF DESCRIPTION OF DRAWINGS

Various ones of the appended drawings merely illustrate example embodiments of the present invention and cannot be considered as limiting its scope.

FIG. 1a-FIG. 1c illustrate interfaces showing grid layouts and maintenance indicator values according to example embodiments.

DETAILED DESCRIPTION

Figure 1A:

The description that follows includes systems, methods, techniques, instruction sequences, and computing machine program products that embody illustrative embodiments of the present invention. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

Systems and methods for proactively and adaptively maintaining equipment are provided. Example 1 is a method for proactive, adaptive equipment maintenance. The method includes maintaining a stress layout representing a physical location. The stress layout includes a grid system having a plurality of cells. A maintenance indicator value for each cell in which a fixed object is located is calculated. This maintenance indicator value represents a stress level applied to the fixed object. A determination whether the maintenance indicator value exceeds a maintenance threshold for the fixed object is performed. Based on the determining that the maintenance indicator value exceeds the maintenance threshold, automatic generation of a maintenance order for the fixed object is triggered.

In Example 2, the subject matter of Example 1 can optionally include the maintenance indicator value being an overall maintenance indicator value. The overall maintenance indicator value may be a summation of maintenance indicator values for all cells in which the fixed object is located.

In Example 3, the subject matter of Examples 1-2 can optionally include tracking movement of a moveable object over the plurality of cells using a global positioning device.

In Example 4, the subject matter of Examples 1-3 can optionally include calculating abrasion points for each cell of the plurality of cells traversed by the moveable object and using the calculated abrasion points to update the maintenance indicator value.

In Example 5, the subject matter of Examples 1-4 can optionally include calculating the abrasion points for each cell, wherein the abrasion points are weight-based abrasion points calculated based on materials and weights of the materials of the moveable object.

In Example 6, the subject matter of Examples 1-5 can optionally include calculating the abrasion points for each cell, wherein the abrasion points are action-based abrasion points. The action-based abrasion points may be added or subtracted with each action performed on by the fixed object on the moveable object.

In Example 7, the subject matter of Examples 1-6 can optionally include tracking movement by receiving coordinates and an order identifier from the global positioning device.

In Example 8, the subject matter of Examples 1-7 can optionally include identifying a transport order or production order using the order identifier.

In Example 9, the subject matter of Examples 1-8 can optionally include identifying cells of the plurality of cells through which the moveable object traverse.

In Example 10, the subject matter of Examples 1-9 can optionally include triggering automatic generation of a maintenance order by accessing a master database of maintenance plans for the fixed object and determining actions to be performed on the fixed object.

In Example 11, the subject matter of Examples 1-10 can optionally include presenting an interface providing a visual representation of the stress layout to a user device.

Example 12 provides a system to perform proactive adaptive equipment maintenance. The system may include a layout module, a point calculation module, an accumulation module, and an order generation module. The layout module maintains a stress layout representing a physical location, whereby the stress layout includes a grid system having a plurality of cells. The point calculation module calculates, using one or more processors, a maintenance indicator value for each cell in which a fixed object is located. The maintenance indicator value represents a stress level applied to the fixed object. The accumulation module determines if the maintenance indicator value exceeds a maintenance threshold for the fixed object. If the maintenance indicator value exceeds the maintenance threshold, the order generation module automatically generates a maintenance order for the fixed object.

In Example 13, the subject matter of Example 12 can optionally include the accumulation module being further to sum the maintenance indicator values for all cells in which the fixed object is located to derive an overall maintenance indicator value. The overall maintenance value may be compared with the maintenance threshold.

In Example 14, the subject matter of Examples 12-13 can optionally include a monitoring module to track movement of a moveable object over the plurality of cells using a global positioning device.

In Example 15, the subject matter of Examples 12-14 can optionally include the point calculation module further to calculate the maintenance threshold indicator by calculating abrasion points for each cell of the plurality of cells traversed by the moveable object and using the calculated abrasion points to update the maintenance indicator value.

In Example 16, the subject matter of Examples 12-15 can optionally include the monitoring module tracking movement by receiving coordinates and an order identifier from the global positioning device, identifying a transport order or production order using the order identifier, and identifying cells of the plurality of cells through which the moveable object traverse.

In Example 17, the subject matter of Examples 12-16 can optionally include the order generation module further to automatic generate the maintenance order by accessing a master database of maintenance plans for the fixed object and determining actions to be performed on the fixed object.

In Example 18, the subject matter of Examples 12-17 can optionally include the layout module further to present an interface providing a visual representation of the stress layout to a user device.

Example 19 can include, or can optionally be combined with any of Examples 1-18 to include, a non-transitory machine-readable storage medium. The non-transitory machine-readable storage medium storing instructions which, when executed by at least one processor, performs operations to provide proactive adaptive equipment maintenance. The operations include maintaining a stress layout representing a physical location, calculating a maintenance indicator value for each cell in which a fixed object is located, determining whether the maintenance indicator value exceeds a maintenance threshold for the fixed object, and automatically generating a maintenance order for the fixed object when the maintenance threshold is exceeded.

In Example 20, the subject matter of Example 19 can optionally include the maintenance indicator value being an overall maintenance indicator value. The overall maintenance indicator value may be a summation of maintenance indicator values for all cells in which the fixed object is located.

With reference to FIG. 1a, an interface illustrating a stress layout 100 is shown. The stress layout 100 may be modeled in an information technology system including one or more computers. In example embodiments, the stress layout 100 is a grid system that represents a physical layout of a location such as, for example, a warehouse or production facility. The grid system may comprise a plurality of cells 102 whereby the physical layout may be scaled to the grid system such that each cell 102 represents a particular dimension of the physical layout (e.g., each cell 102 may be a 1 meter square). In example embodiments, the stress layout 100 may be a visual stress layout that is presentable in an interface to a user device.

Fixed objects (e.g., equipment) may be located in, or associated with, one or more cells 102. As a result, each cell 102 includes an attribute directed to identifying fixed objects associated with the cell 102. The object is "fixed" in the sense that the object is linked to a certain area or cell(s) 102. For example, FIG. 1a indicates that a fixed object traverses nine different cells 102 (i.e., cells B2, B3, B4, C2, C3, C4, D2, D3, and D4) using an equipment object identifier (e.g., "OBJ #1"). In example embodiments, the object is fixed or semi-fixed equipment such as, for example, storage racks, rails between storage racks, and robots moving goods between storage racks. The robots may include both manual and automatic machinery such as forklifts and rack feeders. In some embodiments, the fixed object may be a part of the facility such as a work center or production line.

Each cell 102 of the grid system will accumulate abrasion points associated with an assigned fixed object if the cell 102 is addressed with a moveable object. The movable object may be, for example, materials, products, or goods, in a finished state or in a state of being produced or assembled. Referring now to FIG. 1b, the moveable object is illustrated as being transported from a point labeled "A" to a point labeled "B." As such, the moveable object will traverse across cells B2, C3, and D4. The moveable object may include or be associated with a geographic tag ("geo tag") that identifies a geographic location of the moveable object within the physical layout. For example, the geo tag may be attached to a transport platform on which the moveable object is carried. As a result, each physical movement of the moveable object may be detected by a monitoring system which detects global positioning coordinates (e.g., shown as shaded circles in the cells) and a moveable object identifier of the moveable object. By using the global positioning coordinates, the impacted cells (e.g., B2, C3, and D4) are identified.

Furthermore, the moveable object identifier may be used to determine a production or transport order for the moveable object. The production or transport order includes a listing of material items being moved. For each material item, a weight may be identified from a database (as will be discussed in more detail below) and used to calculate a total weight based on quantities identified in the order. For example, assume the order indicates that a material item X and a material item Y are being transported, and there are 10 quantities of material item X and 5 quantities of material item Y. If the weight of material item X is 8 kilograms and the weight of material item Y is 4 kilograms, then the total weight of the transport order is 100 kilograms (i.e., (8 kilograms×10)+(4 kilograms×5)=100 kilograms).

In example embodiments, the stress or abrasion on a fixed object in the cell 102 is measured in a standardized way per cell associated with the fixed object. For example, one kilogram weight may count as one stress or abrasion point. In the present example, the moveable object has a weight of 100 kilograms. As a result, cells B2, C3, and D4 show calculated abrasion points of 100 for a current order.

The accumulation of the abrasion points results in a maintenance indicator value. The maintenance indicator value is an attribute of the cell 102 that is used to trigger maintenance when required. Continuing with the present example, the calculated abrasion points are used to update the maintenance indicator value for each cell 102. FIG. 1c shows the stress layout 100 whereby particular cells 102 include the maintenance indicator values. Thus, these maintenance indicator values are accumulated abrasion values over time for multiple production or transport orders that indicate stress/abrasion hot spots and cold spots of the fixed objects (or parts of fixed objects) in the cells 102.

It is note that a cell 102 may comprise more than one fixed object. In these cases, the cell 102 may include more than one maintenance indicator value (e.g., one maintenance indicator value per fixed object). Because the system utilizes global positioning coordinates to identify a path of an order, the system may use these same global positioning coordinates to distinguish between two or more fixed objects in the same cell 102.

To trigger proactive maintenance of a fixed object, the maintenance indicator values will be accumulated over all cells 102 for the same fixed object. If a maintenance threshold for the fixed object is exceeded, a maintenance order is automatically generated for the fixed object. For example, the sum of the maintenance indicator values for OBJ #1 is equal to 8000+100+0+200+9000+700+0+6000+100, which is 24,100 points. If the maintenance threshold is less than 24,100 points, then the maintenance process is triggered by automatically generating a maintenance order for the fixed object, OBJ #1.

In some embodiments, the maintenance order may indicate levels of stress or abrasion such that more maintenance may be performed in locations (e.g., cells 102) where the fixed object experienced more abrasion points. For example, the maintenance order may indicate that the fixed object in cells B2, C3, and C4 require more maintenance than in the other cells associated with OBJ #1. As such, equipment maintenance is based on how often the equipment is used, potential wear on the equipment, and a path that is used through a facility, rather than arbitrarily being scheduled.

In example embodiments, the stress layout 100 may be visually displayed in an interface to a user. In these embodiments, the cells 102 of the stress layout 100 are color coordinated in order to visually present stress levels in each cell 102. For example, cells 102 in which the maintenance indicator are high, or that have exceeded the maintenance threshold, may be colored red, while cells 102 that experience low stress may be colored green, and cells 102 that are approaching a high level or the maintenance threshold may be colored yellow. As such, example embodiments enable visualization of stress levels on fixed objects (e.g., equipment) within a physical location.

Figure 2:
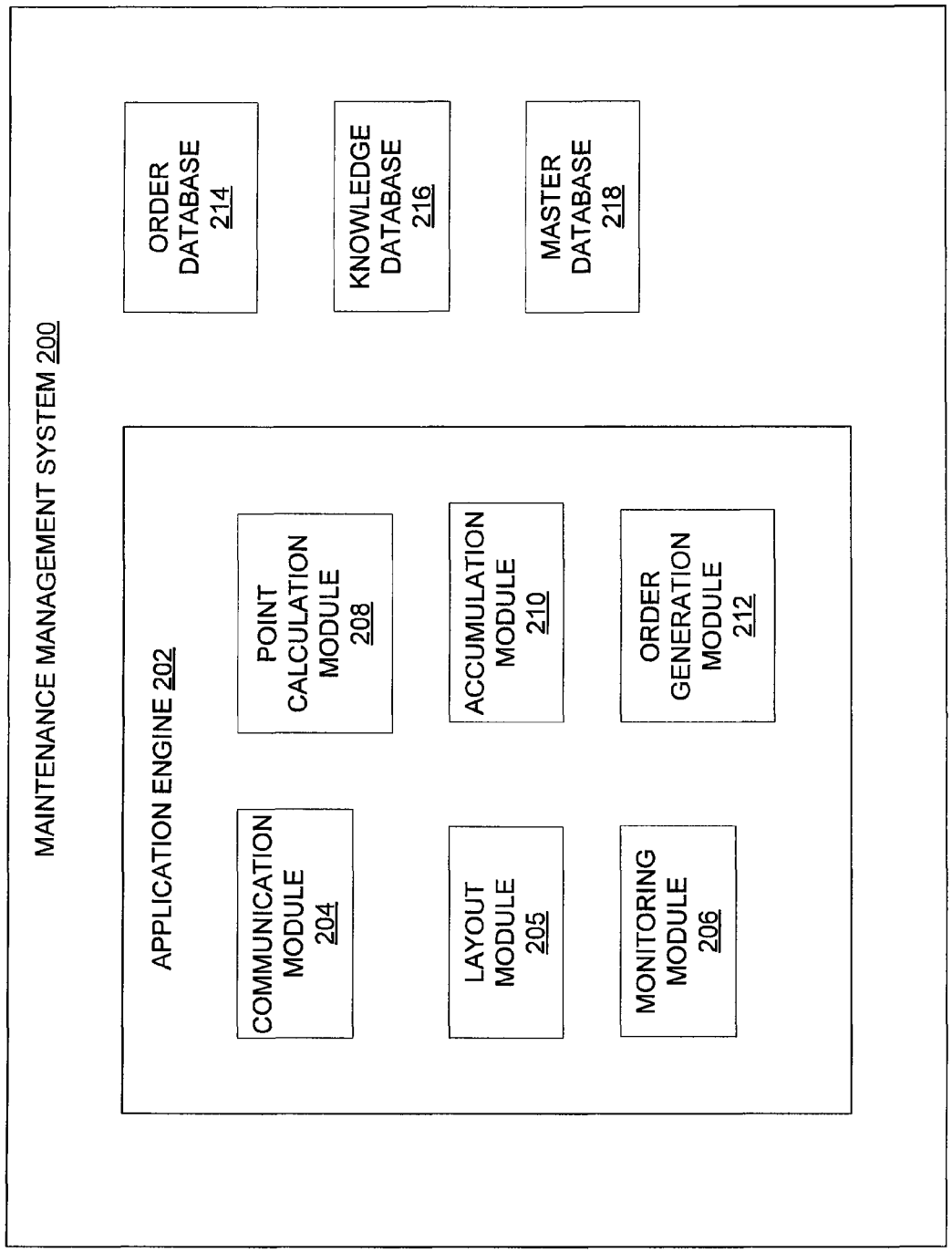
FIG. 2 is a block diagram illustrating a maintenance management system.

FIG. 2 is a block diagram illustrating a maintenance management system 200. The maintenance management system 200 monitors the stress layout 100 and automatically triggers generation of a maintenance order when a maintenance threshold is exceeded by a fixed object. The maintenance management system 200 comprises an application engine 202 which includes a plurality of modules communicatively coupled together to provide proactive adaptive equipment maintenance. In example embodiments, the maintenance management system 200 comprises a communication module 204, a layout module 205, a monitoring module 206, a point calculation module 208, an accumulation module 201, and an order generation module 212.

The maintenance management system 200 further comprises, or is coupled to, a plurality of databases that provide or store data utilized in maintaining the equipment. The databases include an order database 214, a knowledge database 216, and a master database 218. The order database 214 stores production and transport orders as well as any associated information. The knowledge database 216 comprises data regarding maintenance thresholds, which indicate when maintenance should be performed. Based on past experiences, maintenance thresholds may be developed for each fixed object and stored in the knowledge database 216. The master database 218 stores maintenance plans for each fixed object. The maintenance plans may include, for example, information on a type and order of maintenance to be performed on a given fixed object.

The communication module 204 manages communications between the maintenance management system 200 and other devices or systems. For example, the communication module 204 may receive transport orders providing instructions for movement of a moveable object. The transport order may be, for example, a warehouse management transportation order. The transport order describes a source location, a destination location, and a moveable object. In one instance, the transport order may comprises a header with source and destination information and a list of components (e.g., moveable objects) and their quantity. These transport orders may be locally stored in the order database 214 of the maintenance management system 200 or elsewhere in the system. Alternatively, the communication module 204 may receive a production order for an object that is being assembled, and thus moved, along a production path. For simplicity, example embodiments will be discussed with reference to a transport order. However, embodiments of the present invention are equally applicable to production orders.

The communication module 204 may also transmit communications from the maintenance management system 200. Upon the automatic generation of a maintenance order, for example, the communication module 204 transmits the maintenance order to a maintenance system for execution.

The layout module 205 creates and maintains the stress layout for a facility. Using the layout module 205, a user may size or resize cells 102 of the grid system representing the facility (e.g., to scale the cells). The layout module 205 further allows the user to indicate location of fixed objects in the cells 102. In embodiments, where a visual stress layout may be presented to a user device, the layout module 205 generated and provides the interface for displaying the visual stress layout.

The monitoring module 206 monitors movement of moveable objects within the physical layout. In example embodiments, the monitoring module 206 may comprise, or be enabled to operate with, a global positioning device that determines the movement of moveable objects. Each moveable object may include or be linked with geo tags, which may be detected by the global positioning device. As such, the actual positions of a transport including the moveable object may be determined. The monitoring module 206 may record coordinates of the position and timestamps related to the corresponding transport order (e.g., in the order database 214 or elsewhere). The monitoring module 204 may also monitor and record the coordinates of the equipment (e.g., fixed objects) that are executing the transport order.

The point calculation module 208 calculates the abrasion points generated for a transport order. In one embodiment, when the monitoring module 206 detects that a moveable object is traversing across a cell 102, the data obtained by the monitoring module 204 may be used by the point calculation module 208 to calculate the abrasion points for the associated transport order. For example, the monitoring module 206 will detect an identification and location of the moveable object. Based on the identification of the moveable object, the monitoring module 206 may identify the corresponding transport order. The point calculation module 208 then accesses the order database 214 and determines the type of materials and quantity of the materials in the transport order. Weights for these materials may be known or accessible to the point calculation system 208. For example, a database (not shown) comprising material weight information may be coupled to the point calculation system 208. Using the weight information and the quantity of the materials in the transport order, weight-based abrasion points may be calculated. The calculated abrasion points may then be added to the current abrasion points (e.g., current maintenance value indicator) for each cell to obtain a new maintenance value indicator.

While the above embodiment bases the abrasion points on the weight of the materials being moved in the transport order, other embodiments may base the abrasion points on other factors such as, for example, amount or type of action performed on the moveable object by the fixed object. This type of action-based abrasion points may be more applicable in an assembly/production line embodiment. For example, each time the fixed object performs an action on a moveable object, a counter is increased (e.g., abrasion point(s) are added to a maintenance indicator value).

In an alternative embodiment, the counter may perform a countdown. For example, the counter may be set to the maintenance threshold, and each action performed by the fixed object causes a decrease in the counter. When the counter reaches zero, the order generation module 212 may automatically generate a maintenance order. In this embodiment, the accumulation module 210 may not be needed.

The accumulation module 210 manages the maintenance indicator values and determines an overall value for a fixed object. In example embodiments, the accumulation module 210 determines the cells 102 across which a particular fix object traverses. The maintenance indicator values of each of these cells 102 may be summed together to obtain an overall maintenance indicator value for the fixed object. The accumulation module 210 may then compare the overall maintenance indicator value to a maintenance threshold obtained from the knowledge database 216 to determine if the maintenance threshold has been exceeded. In some embodiments, the functions of the point calculation module 208 and the accumulation module 210 may be combined into a single module.

When the maintenance threshold is exceeded for a fixed object, the order generation module 212 triggers the automatic generation of a maintenance order. The order generation module 212 may receive the identifier number of the fixed object (e.g., OBJ #) from the monitoring module 206 or the accumulation module 210. Using the identifier number, the order generation module 212 accesses the master database 218 to obtain maintenance plans for the identified fixed object. The maintenance plans provide information on what maintenance should be performed on the fixed object. In one embodiment, the type of maintenance to be performed may be tied to the amount the maintenance indicator value exceeds the maintenance threshold (e.g., the larger the amount, the more maintenance to be performed). Once the maintenance order is generated by the order generation module 212, the communication module 204 sends the maintenance order to a maintenance system for performance.

Figure 3:
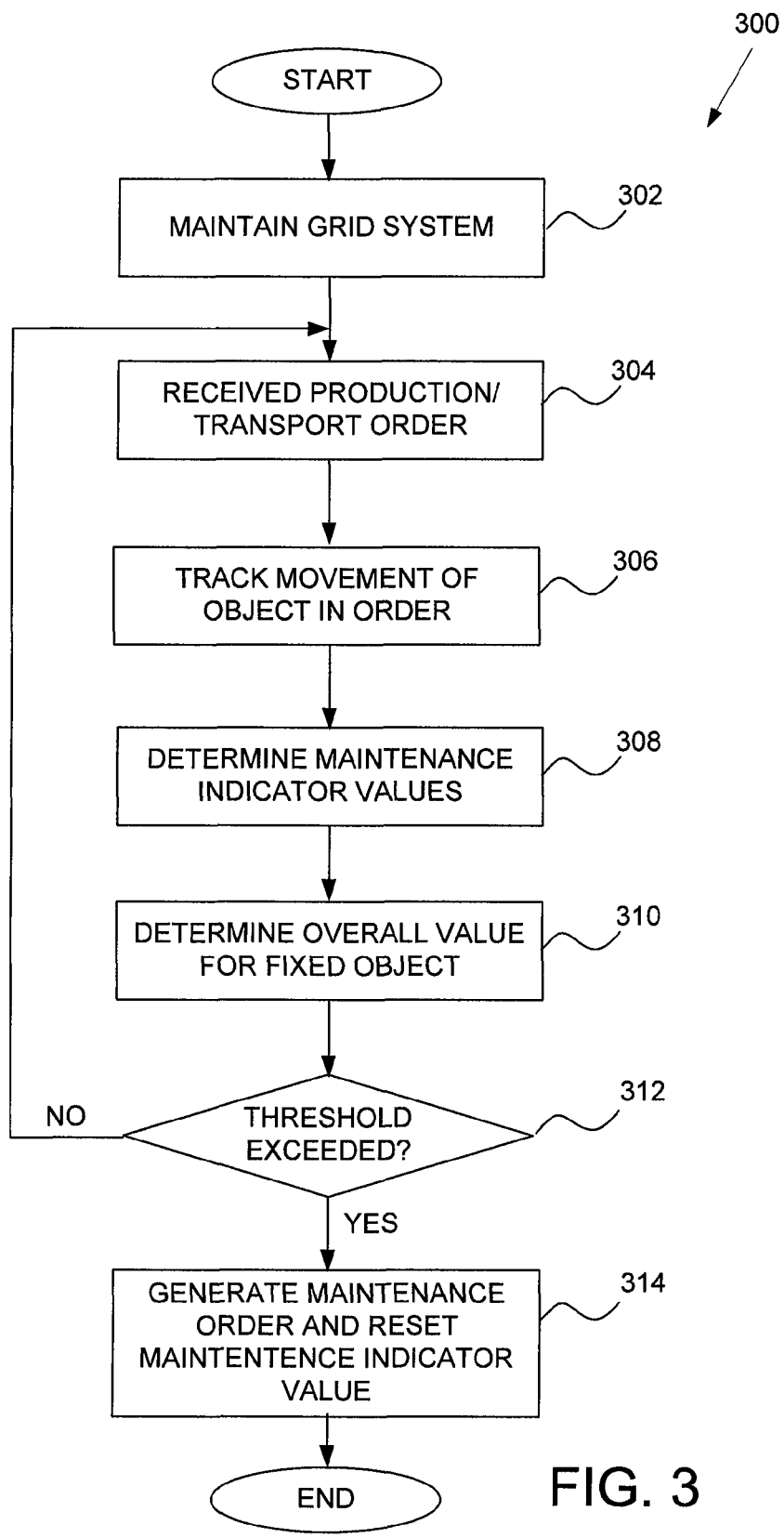
FIG. 3 is a flowchart of an example method to provide proactive adaptive equipment maintenance.

FIG. 3 is a flowchart of an example method 300 to provide proactive adaptive equipment maintenance. In operation 302, a grid system is maintained for a facility. The grid system represents a physical layout of the facility and comprises a plurality of cells 102 scaled to the grid system such that each cell 102 represents a particular dimension of the physical layout. The grid system 302 may be maintained within one or more computing devices.

In operation 304, a production or transport order is received by the maintenance management system 200. In example embodiments, the communication module 204 receives or intercepts the order and stores the order in the order database 214.

Movement of movable objects are tracked in operation 306. In example embodiments, the monitoring module 206 monitors movement of moveable objects within the physical layout. The moveable objects may include or be linked with geo tags, which may be detected by a global positioning device. The monitoring module 206 receives and record coordinates of the position and timestamps related to the corresponding transport order from the global positioning device.

In operation 308, maintenance indicator values are determined for each cell 102 of the grid system and an overall (maintenance indicator) value for a fixed object is determined in operation 310. The method of operations 308 and 310 will be discussed in more detail in connection with FIG. 4 below.

The overall value determined in operation 310 is used to compare against a maintenance threshold to determine if maintenance is required for the corresponding fixed object. A determination is performed in operation 312 to ascertain whether the maintenance threshold is exceeded. In example embodiments, the accumulation module 210 sums the maintenance indicator values of each cells associated with a particular fixed object to obtain an overall maintenance indicator value for the fixed object. The accumulation module 210 may then compare the overall maintenance indicator value to a maintenance threshold obtained from the knowledge database 216 for the fixed object to determine if the maintenance threshold has been exceeded.

If the maintenance threshold is exceeded for the fixed object, a maintenance order is automatically, without human intervention, generated by the order generation module 212 in operation 314. In one embodiment, the order generation module 212 accesses, using an identifier number of the fixed object, the master database 218 to obtain maintenance plans for the identified fixed object. The maintenance plans provide information on what maintenance should be performed on the fixed object. Using the maintenance plan for the identified fixed object, the order generation module 212 may generate the maintenance order including actions to be performed on the fixed object. The maintenance order may include the type of maintenance to be performed on the fixed object as determined by the order generation module 212 using the maintenance plan information from the master database 218 for the fixed object.

Upon generation of the maintenance order, the maintenance indicator values for the affected cells associated with the fixed object may be reset according to one embodiment. In other embodiments, the maintenance indicator value may not be reset until an indication that maintenance work is completed on the fixed object is received by the communication module 204.

In an alternative embodiment, the automatic generation of the maintenance order may be triggered when a maintenance indicator value of any cell associated with a fixed object exceeds a maintenance threshold. For example and referring to FIG. 1c, 1f a maintenance threshold for OBJ #1 is 7500, then the maintenance indicator value for OBJ #1 in cells B2 and C3 exceed the maintenance threshold for the fixed object. Thus, a maintenance order may be generated for maintenance of the fixed object as a whole or only with respect to parts of the fixed object associated with the cells B2 and C3.

Figure 4:
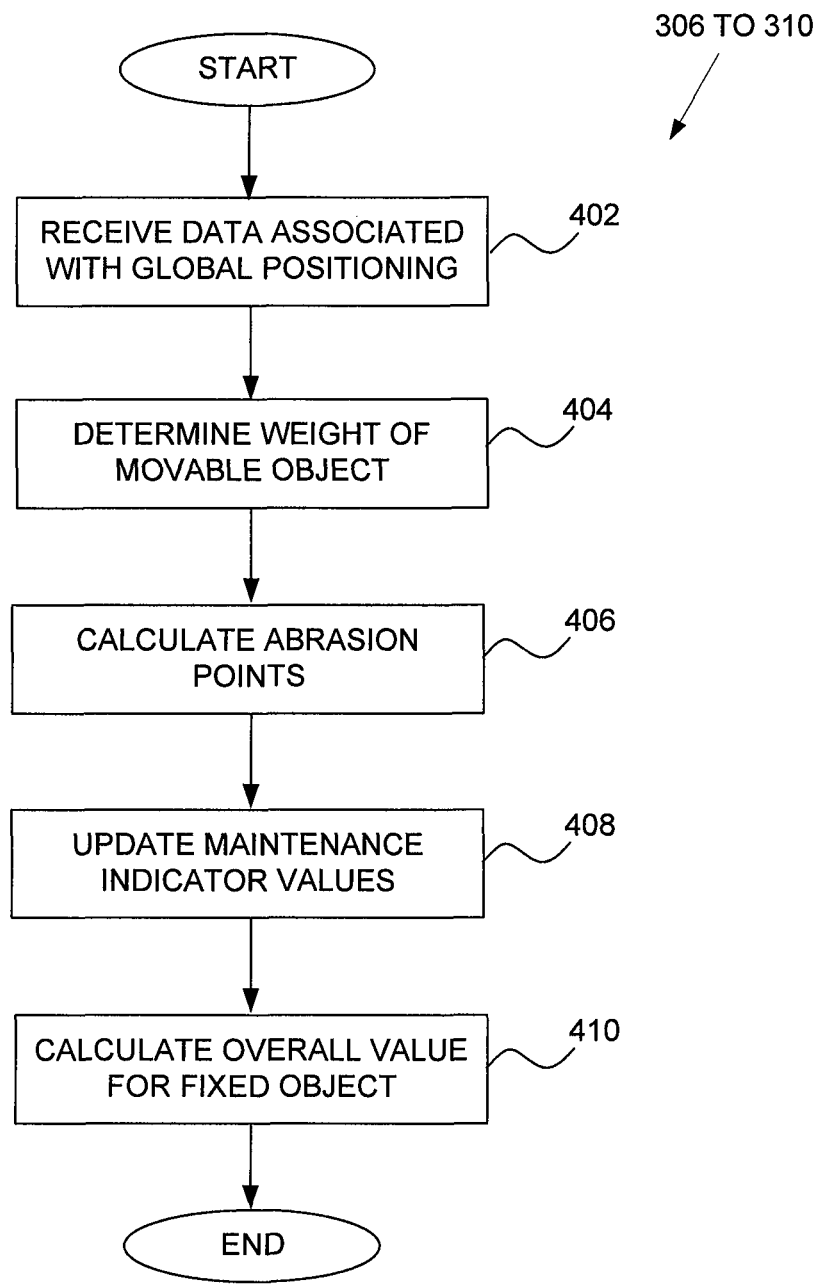
FIG. 4 is a flowchart of an example method to determine maintenance indicator values.

FIG. 4 is a flowchart of an example method (e.g., operations 306 to 310) to determine an overall value for a fixed object. In operation 402, data is received from a global positioning device indicating a movement of a fixed object. The data includes an identification of a transport order containing the moveable object being transported.

Using the identification of the transport order, weight for the movable object is determined in operation 404. In one embodiment, the point calculation module 208 accesses the order database 214 and determines the type of materials and quantity of the materials being transported in the transport order. Weights for these materials may be known or accessible to the point calculation system 208. For example, a database (not shown) comprising material weight information may be coupled to the point calculation system 208.

Using the weight information and the quality of the materials in the transport order, weight-based abrasion points may be calculated in operation 406 by the point calculation system 208. For example, assume the transport order indicates that a material item X and a material item Y are being transported, and there are 10 quantities of material item X and 5 quantities of material item Y. If the weight of material item X is 8 kilograms and the weight of material item Y is 4 kilograms, then the total weight of the transport order is 100 kilograms.

The calculated abrasion points may then be added to the current abrasion points (e.g., current maintenance value indicator) for each cell 102 to obtain a new maintenance value indicator in operation 408. Continuing with the example, 100 abrasion points (e.g., assuming an abrasion point is equal to one kilogram) is added to a current maintenance value indicator for each cell 102 traversed by the movable object of the transport order.

In operation 410, an overall (maintenance indicator) value is calculated for a fixed object by the accumulation module 210. In example embodiments, the accumulation module 210 determines the cells 102 across which a particular fix object traverses. The maintenance indicator values of each of these cells may then be summed together to obtain an overall value for the fixed object. For example and referring back to FIG. 1c, the sum of the maintenance indicator values for OBJ #1 is equal to 8000+100+0+200+9000+700+0+6000+100, which is 24,100 points.

While the method of FIG. 4 utilizes abrasion points based on the weight of the materials of a moveable object being moved in the transport order, an alternative embodiment may base the abrasion points on an amount or type of action performed on the moveable object by the fixed object (e.g., in an assembly/production line embodiment). For example, each time the fixed object performs an action on a moveable object, a counter is increased (e.g., abrasion point(s) are added to a maintenance indicator value). In these embodiments, operations 404 and 406 may not be performed. Instead, the maintenance indicator values may simply be updated, in operation 408, each time an action is performed on a moveable object by the fixed object at each cell 102 associated with the fixed object.

Certain embodiments described herein may be implemented as logic or a number of modules, engines, components, or mechanisms. A module, engine, logic, component, or mechanism (collectively referred to as a "module") may be a tangible unit capable of performing certain operations and configured or arranged in a certain manner. In certain exemplary embodiments, one or more computer systems (e.g., a standalone, client, or server computer system) or one or more components of a computer system (e.g., a processor or a group of processors) may be configured by software (e.g., an application or application portion) or firmware (note that software and firmware can generally be used interchangeably herein as is known by a skilled artisan) as a module that operates to perform certain operations described herein.

In various embodiments, a module may be implemented mechanically or electronically. For example, a module may comprise dedicated circuitry or logic that is permanently configured (e.g., within a special-purpose processor, application specific integrated circuit (ASIC), or array) to perform certain operations. A module may also comprise programmable logic or circuitry (e.g., as encompassed within a general-purpose processor or other programmable processor) that is temporarily configured by software or firmware to perform certain operations. It will be appreciated that a decision to implement a module mechanically, in the dedicated and permanently configured circuitry, or in temporarily configured circuitry (e.g., configured by software) may be driven by, for example, cost, time, energy-usage, and package size considerations.

Accordingly, the term "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which modules or components are temporarily configured (e.g., programmed), each of the modules or components need not be configured or instantiated at any one instance in time. For example, where the modules or components comprise a general-purpose processor configured using software, the general-purpose processor may be configured as respective different modules at different times. Software may accordingly configure the processor to constitute a particular module at one instance of time and to constitute a different module at a different instance of time.

Modules can provide information to, and receive information from, other modules. Accordingly, the described modules may be regarded as being communicatively coupled. Where multiples of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices and can operate on a resource (e.g., a collection of information).

Figure 5:
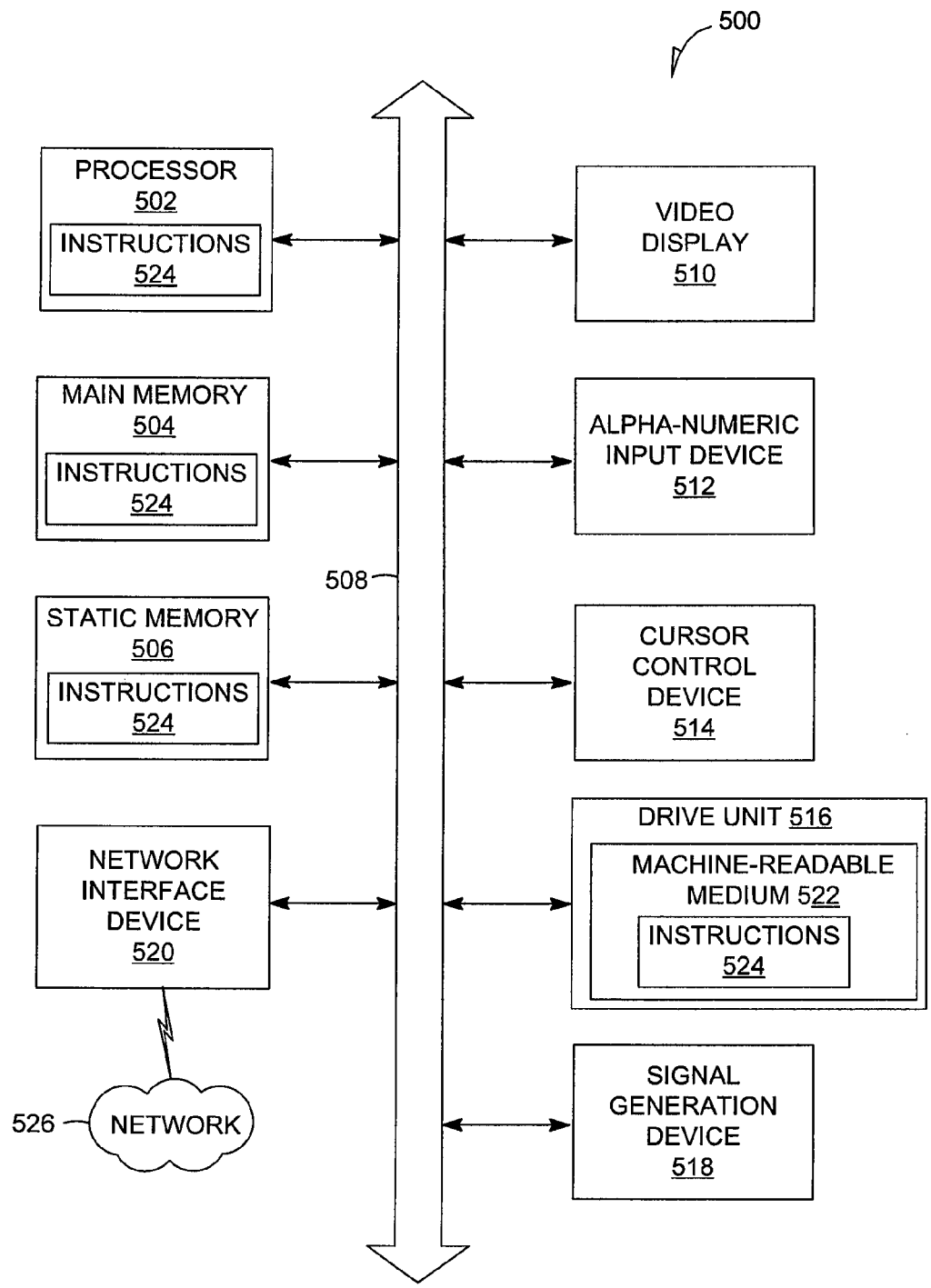
FIG. 5 is a simplified block diagram of a machine in an example form of a computing system within which a set of instructions for causing the machine to perform any one or more of the methodologies discussed herein may be executed.

With reference to FIG. 5, an example embodiment extends to a machine in the example form of a computer system 500 within which instructions for causing the machine to perform any one or more of the methodologies discussed herein may be executed. In alternative example embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, a switch or bridge, a server, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 500 may include a processor 502 (e.g., a central processing unit (CPU), a graphics processing unit (GPU) or both), a main memory 504 and a static memory 506, which communicate with each other via a bus 508. The computer system 500 may further include a video display unit 510 (e.g., a liquid crystal display (LCD) or a cathode ray tube (CRT)). In example embodiments, the computer system 500 also includes one or more of an alpha-numeric input device 512 (e.g., a keyboard), a user interface (UI) navigation device or cursor control device 514 (e.g., a mouse), a disk drive unit 516, a signal generation device 518 (e.g., a speaker), and a network interface device 520.

The disk drive unit 516 includes a machine-readable storage medium 522 on which is stored one or more sets of instructions 524 and data structures (e.g., software instructions) embodying or used by any one or more of the methodologies or functions described herein. The instructions 524 may also reside, completely or at least partially, within the main memory 504 or within the processor 502 during execution thereof by the computer system 500, the main memory 504 and the processor 502 also constituting machine-readable media.

While the machine-readable storage medium 522 is shown in an exemplary embodiment to be a single medium, the term "machine-readable storage medium" may include a single storage medium or multiple media (e.g., a centralized or distributed database, or associated caches and servers) that store the one or more instructions. The term "machine-readable storage medium" shall also be taken to include any tangible medium that is capable of storing, encoding, or carrying instructions for execution by the machine and that causes the machine to perform any one or more of the methodologies of embodiments of the present invention, or that is capable of storing, encoding, or carrying data structures used by or associated with such instructions. The term "machine-readable storage medium" shall accordingly be taken to include, but not be limited to, solid-state memories, optical and magnetic media, and non-transitory machine-readable storage media. Specific examples of machine-readable storage media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and CD-ROM and DVD-ROM disks.

The instructions 524 may further be transmitted or received over a communications network 526 using a transmission medium via the network interface device 520 and utilizing any one of a number of well-known transfer protocols (e.g., HTTP). Examples of communication networks include a local area network (LAN), a wide area network (WAN), the Internet, mobile telephone networks, Plain Old Telephone (POTS) networks, and wireless data networks (e.g., WiFi and WiMax networks). The term "transmission medium" shall be taken to include any intangible medium that is capable of storing, encoding, or carrying instructions for execution by the machine, and includes digital or analog communications signals or other intangible medium to facilitate communication of such software.

Although an overview of the inventive subject matter has been described with reference to specific exemplary embodiments, various modifications and changes may be made to these embodiments without departing from the broader spirit and scope of embodiments of the present invention. Such embodiments of the inventive subject matter may be referred to herein, individually or collectively, by the term "invention" merely for convenience and without intending to voluntarily limit the scope of this application to any single invention or inventive concept if more than one is, in fact, disclosed.

As used herein, the term "or" may be construed in either an inclusive or exclusive sense. Additionally, although various example embodiments discussed focus on a specific network-based environment, the embodiments are given merely for clarity in disclosure. Thus, any type of electronic system, including various system architectures, may employ various embodiments of the search system described herein and is considered as being within a scope of example embodiments.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A method comprising:
maintaining a stress layout representing a physical location, the stress layout including a grid system having a plurality of cells;
calculating, by one or more processors, a maintenance indicator value for each cell in which a fixed object is located, the maintenance indicator value representing a stress level applied to the fixed object;
determining whether the maintenance indicator value exceeds a maintenance threshold that indicates when maintenance should be performed on the fixed object; and
automatically generating, without human intervention, a maintenance order that triggers maintenance for the fixed object in response to the maintenance indicator value exceeding the maintenance threshold.

2. The method of claim 1, wherein the maintenance indicator value is an overall maintenance indicator value, the overall maintenance indicator value being a summation of maintenance indicator values for all cells in which the fixed object is located.

3. The method of claim 1, further comprising
tracking movement of a moveable object over the plurality of cells using a global positioning device.

4. The method of claim 3, further comprising:
calculating abrasion points for each cell of the plurality of cells traversed by the moveable object; and
using the calculated abrasion points to update the maintenance indicator value.

5. The method of claim 4, wherein the abrasion points are weight-based abrasion points calculated based on materials and weights of the materials of the moveable object.

6. The method of claim 4, wherein the abrasion points are action-based abrasion points, the action-based abrasion points being added or subtracted with each action performed on by the fixed object on the moveable object.

7. The method claim 3, wherein tracking movement comprising receiving coordinates and an order identifier from the global positioning device.

8. The method of claim 7, further comprising identifying a transport order or production order using the order identifier.

9. The method of claim 7, further comprising identifying cells of the plurality of cells through which the moveable object traverse.

10. The method of claim 1, further comprising:
accessing a master database of maintenance plans for the fixed object; and
determining actions to be performed on the fixed object.

11. The method of claim 1, further comprising presenting an interface providing a visual representation of the stress layout to a user device.

12. A system comprising:
one or more processors of a machine;
a layout module to maintain a stress layout representing a physical location, the stress layout including a grid system having a plurality of cells;
a point calculation module to calculate, using one or more processors, a maintenance indicator value for each cell in which a fixed object is located, the maintenance indicator value representing a stress level applied to the fixed object;
an accumulation module to determine whether the maintenance indicator value exceeds a maintenance threshold that indicates when maintenance should be performed on the fixed object; and
an order generation module to automatically, without human intervention, generate a maintenance order that triggers maintenance for the fixed object in response to the maintenance indicator value exceeding the maintenance threshold.

13. The system of claim 12, wherein the accumulation module is further to sum the maintenance indicator values for all cells in which the fixed object is located to derive an overall maintenance indicator value, the overall maintenance value to be compared with the maintenance threshold.

14. The system of claim 12, further comprising a monitoring module to track movement of a moveable object over the plurality of cells using a global positioning device.

15. The system of claim 14, wherein the point calculation module is to calculate the maintenance threshold indicator by calculating abrasion points for each cell of the plurality of cells traversed by the moveable object and using the calculated abrasion points to update the maintenance indicator value.

16. The system of claim 12, wherein the monitoring module tracks movement by receiving coordinates and an order identifier from the global positioning device, identifying a transport order or production order using the order identifier, and identifying cells of the plurality of cells through which the moveable object traverse.

17. The system of claim 12, wherein the order generation module is to automatic generate the maintenance order by accessing a master database of maintenance plans for the fixed object and determining a type of maintenance to be performed on the fixed object.

18. The system of claim 12, wherein the layout module is further to present an interface providing a visual representation of the stress layout to a user device.

19. A non-transitory machine-readable storage medium in communication with at least one processor, the machine-readable storage medium storing instructions which, when executed by the at least one processor, performs operations comprising:
maintaining a stress layout representing a physical location, the stress layout including a grid system having a plurality of cells;
calculating, by one or more processors, a maintenance indicator value for each cell in which a fixed object is located, the maintenance indicator value representing a stress level applied to the fixed object;
determining whether the maintenance indicator value exceeds a maintenance threshold that indicates when maintenance should be performed on the fixed object; and
automatically generating, without human intervention, a maintenance order that triggers maintenance for the fixed object in response to the maintenance indicator value exceeding the maintenance threshold.

20. The non-transitory machine-readable storage medium of claim 19, wherein the maintenance indicator value is an overall maintenance indicator value, the overall maintenance indicator value being a summation of maintenance indicator values for all cells in which the fixed object is located.

* * * * *